United States Patent [19]
Murai et al.

[11] Patent Number: 5,344,713
[45] Date of Patent: Sep. 6, 1994

[54] METHOD FOR MANUFACTURING STEEL WIRE MATERIAL FOR REINFORCING OPTICAL FIBER

[75] Inventors: Teruyuki Murai; Susumu Yamamoto, both of Itami, Japan

[73] Assignee: Sumitomo Electric Industries Ltd., Osaka, Japan

[21] Appl. No.: 922,423

[22] Filed: Jul. 31, 1992

Related U.S. Application Data

[62] Division of Ser. No. 503,027, Apr. 2, 1990, Pat. No. 5,189,720.

[30] Foreign Application Priority Data

Apr. 3, 1989 [JP] Japan .................................. 1-85177

[51] Int. Cl.$^5$ .......................................... C23C 22/73
[52] U.S. Cl. ......................... 428/472.3; 148/262; 148/253; 72/42
[58] Field of Search ................ 72/42; 148/262, 246, 148/253; 428/472.3

[56] References Cited

U.S. PATENT DOCUMENTS

| | | | |
|---|---|---|---|
| 2,743,204 | 4/1956 | Russel | 148/260 |
| 2,875,111 | 2/1959 | Wilkenson | 148/246 |
| 4,688,441 | 8/1987 | Hagita | 72/42 |
| 4,944,813 | 7/1990 | Hosemann | 148/263 |
| 4,983,229 | 1/1991 | Tull | 72/42 |

*Primary Examiner*—Sam Silverberg
*Attorney, Agent, or Firm*—Nikaido, Marmelstein, Murray & Oram

[57] ABSTRACT

A method for manufacturing a steel wire material for reinforcing an optical fiber is proposed. In this method, a steel wire is firstly subjected to a chemical conversion treatment. The wire is then drawn with a reduction of area of 30% or more. As a result, a coating capable of effectively restraining the production of hydrogen is formed on the surface of the wire.

9 Claims, 2 Drawing Sheets

METHOD FOR MANUFACTURING STEEL WIRE MATERIAL FOR REINFORCING OPTICAL FIBER

This is a division of application Ser. No. 503,027 filed Apr. 2, 1990, now U.S. Pat. No. 5,189,720.

BACKGROUND OF THE INVENTION

The present invention relates to a method for manufacturing a steel wire material for reinforcing an optical fiber, the material having on the surface thereof a coating capable of effectively preventing the production of hydrogen.

As a reinforcing material for an optical fiber, steel wire materials such as steel wire or strand and organic high-molecular fibers are used. Among them, since steel wire materials are inexpensive and have a high strength and high rigidity, they are widely used.

But with the steel wire material, because its resistance to corrosion is generally poor, if moisture infiltrates into the optical fiber, corrosion will progress and cause the breakage of wire. Also, it is possible that hydrogen gas is produced as a result of reaction between the steel wire itself and moisture. The hydrogen gas might infiltrate into the optical fiber, thus lowering its light transmission efficiency. Such a problem is peculiar to a steel wire for reinforcing an optical fiber.

It is believed that there is a certain correlation between the corrosion resistance of the steel wire and the amount of hydrogen produced. Thus various methods have been proposed to increase the corrosion resistance of steel wire materials used to reinforce an optical fiber.

One method is to plate a steel wire material with zinc or copper. But, because zinc plating is formed by attaching zinc having a low corrosion potential with respect to steel to preferentially corrode the zinc and thus protect the steel against corrosion, hydrogen gas might be produced if the copper and moisture react with each other as shown by the following formula.

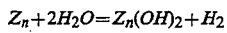

$$Z_n + 2H_2O = Z_n(OH)_2 + H_2$$

This will cause a reduction in the light transmission efficiency of the optical fiber. Thus, this method is effective in protecting the steel against corrosion but not in preventing the production of hydrogen at all.

On the other hand, copper plating is formed by attaching to a surface copper having a high corrosion potential with respect to steel. In this method, if there is a defect in the plating surface such as a pin hole, the steel will begin to corrode from this point. In order to assure a high corrosion resistance, it is necessary to increase the thickness of the plating. But thickening the plating will result in an increase in the plating time, thus lowering the productivity and increasing the cost.

Also it was proposed to coat a steel wire with aluminum, titanium or an alloy thereof to protect the steel wire against corrosion. But with this method, too, the production cost tends to be rather high.

Further, it was proposed to cover a steel wire with a film of organic resin to protect the steel wire against corrosion. But in addition to the fact that organic resins are expensive, some of them produce hydrogen themselves and some allow hydrogen to pass therethrough easily. Further, in order to prevent the formation of pin holes, it is necessary to increase the thickness of the coating. This will further increase the production cost.

Thus none of the conventional anti-corrosion methods was capable of sufficiently restraining the production of hydrogen from a steel wire material used as a material for reinforcing an optical fiber.

SUMMARY OF THE INVENTION

It is an object of the present invention to provide a method for manufacturing at low cost a steel wire material for reinforcing an optical fiber, the material being provided with a coating having an excellent corrosion resistance and less likely to produce hydrogen while in use.

In accordance with the present invention, there is provided a method for manufacturing a steel wire material for reinforcing an optical fiber, the method comprising the steps of subjecting a steel wire to a chemical conversion treatment to form a coating at the rate of 10 grams per square meter or more, and drawing the wire with a reduction of area of 30% or more.

In the chemical coversion treatment, a steel material is immersed in a phosphate solution or the like to form or coat a water-insoluble compound on the surface of the steel material.

Before being drawn, a steel wire is subjected to the chemical conversion treatment to form a chemical conversion coating thereon with an amount of 10 grams per square meter or more. Then the wire is drawn with a reduction of area of 30% or more. When the wire is drawn, the chemical conversion coating formed on the wire is pressed against the surface of the steel wire while keeping its high density.

The amount of the chemical conversion coating formed on the element wire should be 10 grams per square meter or more. If it is less than 10 grams, it will be impossible to sufficiently cover the steel wire and thus to effectively restrain the production of hydrogen from the steel wire.

Since the chemical conversion coating formed on the surface of the steel wire is insoluble in water and stable, the steel wire will not react with water at its surface. Thus the steel wire is restrained from producing hydrogen.

The steel wire material according to the present invention is inexpensive and is less likely to react with water and thus produces little hydrogen compared with a prior art zinc-plated or copper-plated wire used as a steel wire material for reinforcing an optical fiber.

Other features and objects of the present invention will become apparent from the following description taken with reference to the accompanying drawings.

FIRST EXAMPLE

Steel wires having their surface coated with zinc phosphate under different conditions, a zinc-plated steel wire and a steel wire thickly plated with copper were compared with one another in the amount of hydrogen produced.

Table 1 shows the surface conditions of the specimens, which are element wires 1.8 mm in diameter.

These wires were drawn until their diameters are reduced to 0.6 mm (reduction of area: 89%)

Figure 1:
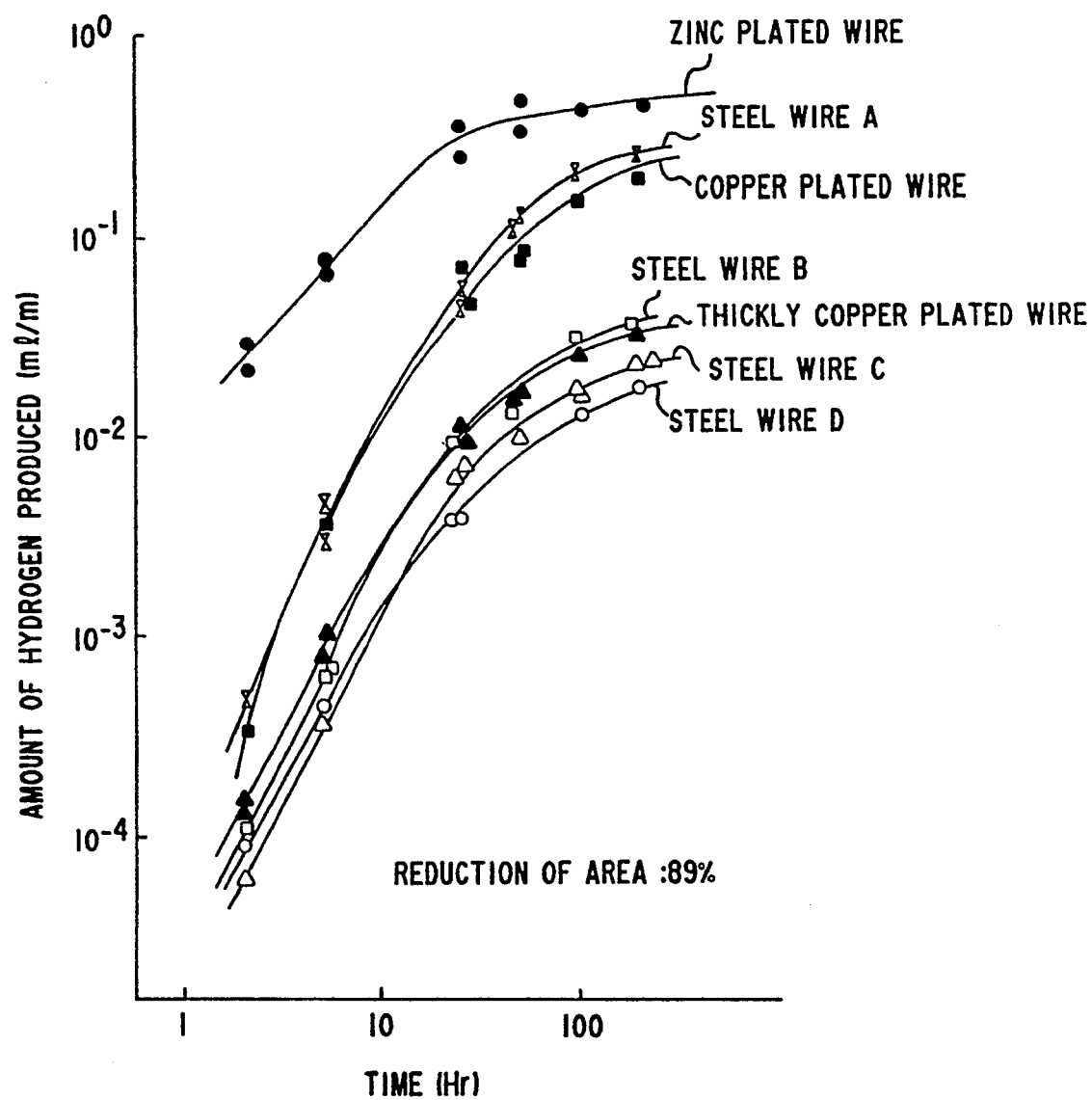
FIG. 1 is a graph showing the relationship between the amount of hydrogen produced and the testing time in the hydrogen producing test in which various steel wire materials were reacted with moisture.

The thus drawn specimens shown in Table 1 were plated in a sealed vessel together with water, the amount of which is equal to 0.5 percent of the internal volume of the vessel and kept in a constant temperature bath at 80° C. Then the amounts of hydrogen produced by the reaction between moisture and metal were measured by gas chromatography. The results are shown in FIG. 1.

The results show that specimens according to the present invention produce little hydrogen compared with the other specimens.

SECOND EXAMPLE

Among the specimens shown in Table 1, the steel wires treated with zinc phosphate B, which were in the form of element wires 1.8 mm in diameter, were drawn to different diameters and put to the same hydrogen producing test as in the first Example.

Figure 2:
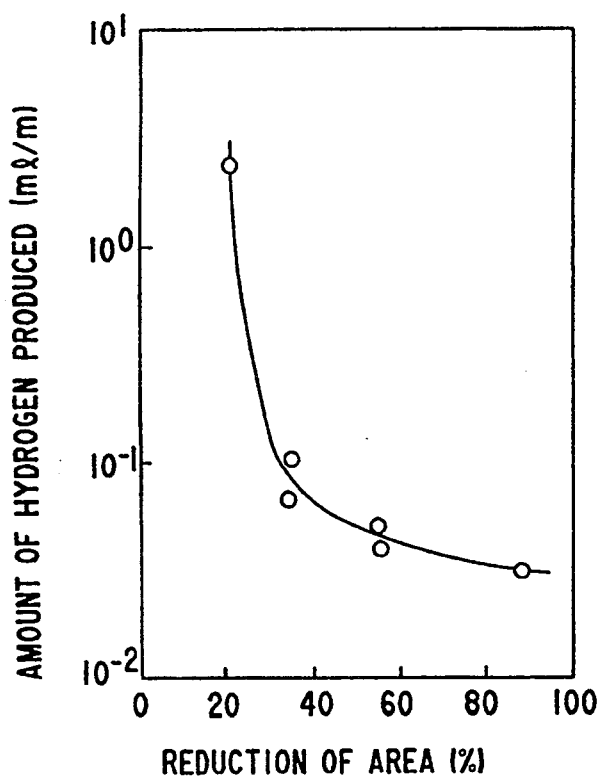
FIG. 2 is a graph showing the relationship between the reduction of area and the amount of hydrogen produced in 100 hours after the hydrogen producing test has begun in which steel wires treated with zinc phosphate and drawn with different area reduction rates were reacted with water.

The amount of hydrogen produced from each of the steel wires was measured by gas chromatography. The results are shown in FIG. 2.

The results show that if the reduction of area is less than 30%, it is difficult to effectively restrain the production of hydrogen.

THIRD EXAMPLE

The amounts of hydrogen produced were checked for the steel wires coated with manganese phosphate.

Table 2 shows the amounts of manganese phosphate formed on the specimens, that is, the element wires 1.8 mm in diameter.

The specimens were drawn until their diameters were reduced to 0.8 mm (reduction of area: 75%). Then they were put to the same hydrogen producing test as in the first Example.

Figure 3:
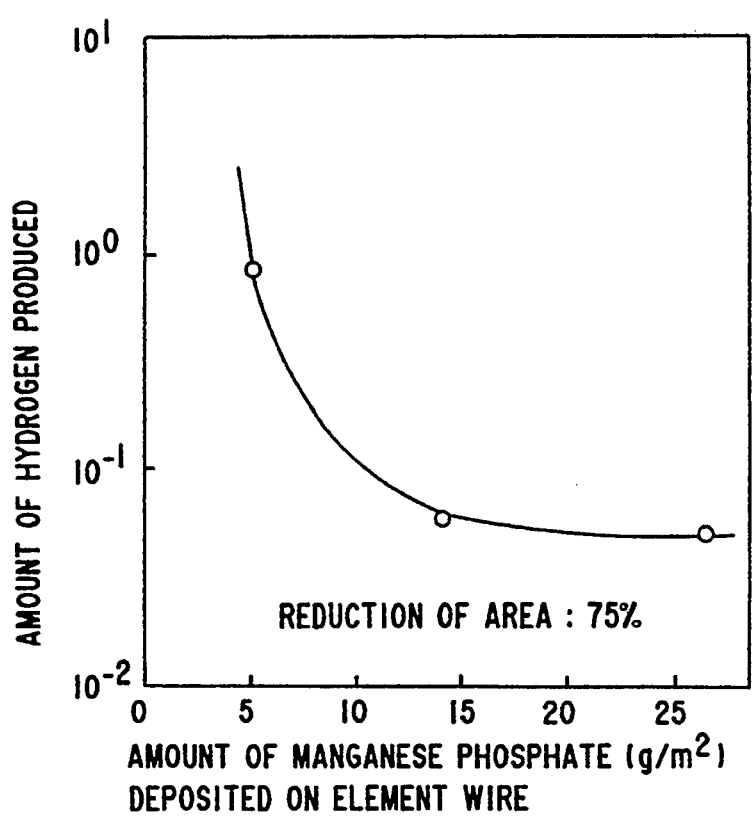
FIG. 3 is a graph showing the relationship between the amount of manganese phosphate formed on the steel wire and the amount of hydrogen produced in 100 hours after the hydrogen producing test has begun in which the steel wire treated with manganese phosphate was reacted with water.

The amounts of hydrogen produced in 100 hours were measured by gas chromatography. The results are shown in FIG. 3. The results show that the steel wires treated with manganese phosphate with an amount of 10 grams per square meter or more produced little hydrogen.

TABLE 1

| Specimen | Surface condition |
| --- | --- |
| Steel wire treated with zinc phosphate (A) Present Invention | Zinc phosphate coating formed with amount of 4–6 gr/m² |
| Steel wire treated with zinc phosphate (B) | Zinc phosphate coating formed with amount of 13–15 gr/cm² |
| Steel wire treated with zinc phosphate (C) | Zinc phospahte coating formed with amount of 24–26 gr/cm² |
| Steel wire treated with zinc phosphate (D) | Zinc phospahte coating formed with amount of 38–41 gr/cm² |

TABLE 1-continued

| Specimen | Surface condition |
| --- | --- |
| Zinc plated steel wire | Plating with molten zinc formed zinc film about 30–40 microns thick with 150–200 gr/m² |
| Copper plated steel wire | Plating with copper pirrolinate and copper sulfate formed copper film about 1.5–2 microns thick with 13–15 gr/m² |
| Thickly copper plated steel wire | Plating with copper pirrolinate and copper sulfate formed copper film about 6–8 microns thick with 50–60 gr/m² |

TABLE 2

| Specimens | Amount coated |
| --- | --- |
| Steel wire treated with manganese phosphate (E) | 5 gr/m² |
| Steel with treated with manganese phosphate (F) | 14 gr/m² |
| Steel with treated with manganese phosphate (G) | 26 gr/m² |

What is claimed is:

1. In the method of making a steel wire coated with a chemical conversion coating used for reinforcing an optical fiber comprising:
   immersing said steel wire in a solution of a chemical conversion coating compound;
   thereby depositing said chemical conversion coating on said steel wire; and
   drawing said coated steel wire to produce a finished coated steel wire product, the improvement, whereby forming a coated steel wire which is less susceptible to reaction with moisture to evolve hydrogen, and is therefore well suited to use as a reinforcement for an optical fiber, which comprises:
   drawing said coated wire an amount sufficient to reduce its area at least about 30%; and
   depositing enough chemical conversion coating on said steel wire so that, after said drawing, at least about 13 gms/m² of said coating remains on said wire.

2. An improved method as claimed in claim 1 wherein said chemical conversion coating is a phosphate.

3. An improved method as claimed in claim 2 wherein said phosphate is magnesium phosphate.

4. An improved method as claimed in claim 2 wherein said phosphate is zinc phosphate.

5. The product of the process of claim 1.

6. A steel wire used for reinforcing an optical fiber sufficiently covered with a chemical conversion coating thereon to substantially prevent the reaction of said steel with moisture; said coating comprising at least about 13 gms/m² after said coated steel wire has been drawn an amount sufficient to reduce its area at least about 30%.

7. A steel wire as claimed in claim 4 wherein said chemical conversion coating is a phosphate.

8. A steel wire as claimed in claim 7 wherein said phosphate is magnesium phosphate.

9. A steel wire used for reinforcing an optical fiber as claimed in claim 8 wherein said phosphate is zinc phosphate.

* * * * *